United States Patent
Kroeker et al.

(10) Patent No.: US 6,895,377 B2
(45) Date of Patent: May 17, 2005

(54) PHONETIC DATA PROCESSING SYSTEM AND METHOD

(75) Inventors: John Kroeker, Hamilton, MA (US); Oleg Boulanov, Beverly, MA (US); Andrey Yelpatov, Beverly, MA (US)

(73) Assignee: Eliza Corporation, Beverly, MA (US)

(*) Notice: Subject to any disclaimer, the term of this patent is extended or adjusted under 35 U.S.C. 154(b) by 438 days.

(21) Appl. No.: 09/815,769

(22) Filed: Mar. 23, 2001

(65) Prior Publication Data

US 2001/0049601 A1 Dec. 6, 2001

Related U.S. Application Data

(60) Provisional application No. 60/192,091, filed on Mar. 24, 2000, provisional application No. 60/191,915, filed on Mar. 24, 2000, provisional application No. 60/192,090, filed on Mar. 24, 2000, and provisional application No. 60/192,076, filed on Mar. 24, 2000.

(51) Int. Cl.[7] .............................................. G10L 15/00
(52) U.S. Cl. ....................................... 704/257; 704/256
(58) Field of Search ................................ 704/9, 257, 7, 704/24, 246, 256

(56) References Cited

U.S. PATENT DOCUMENTS

| | | | | |
|---|---|---|---|---|
| 4,688,195 A | * | 8/1987 | Thompson et al. ............ 706/11 |
| 4,829,423 A | * | 5/1989 | Tennant et al. ................ 704/8 |
| 5,027,408 A | | 6/1991 | Kroeker et al. | |
| 5,083,268 A | | 1/1992 | Hemphill et al. | |
| 5,168,524 A | | 12/1992 | Kroeker et al. | |
| 5,369,726 A | | 11/1994 | Kroeker et al. | |
| 5,457,768 A | * | 10/1995 | Tsuboi et al. ................ 704/231 |
| 5,647,002 A | | 7/1997 | Brunson | |
| 5,659,542 A | | 8/1997 | Bell et al. | |
| 5,687,212 A | | 11/1997 | Kinser, Jr. et al. | |
| 5,687,384 A | | 11/1997 | Nagase | |
| 5,729,656 A | | 3/1998 | Nahamoo et al. | |
| 5,748,841 A | * | 5/1998 | Morin et al. ................ 704/257 |
| 5,799,276 A | | 8/1998 | Komissarchik et al. | |
| 5,822,728 A | | 10/1998 | Applebaum et al. | |
| 5,822,729 A | | 10/1998 | Glass | |
| 5,825,977 A | | 10/1998 | Morin et al. | |
| 5,835,890 A | | 11/1998 | Matsui et al. | |
| 5,864,614 A | | 1/1999 | Farris et al. | |
| 5,966,686 A | * | 10/1999 | Heidorn et al. ................ 704/9 |
| 6,052,682 A | | 4/2000 | Miller et al. | |
| 6,243,670 B1 | * | 6/2001 | Bessho et al. ................ 704/9 |
| 6,505,157 B1 | * | 1/2003 | Elworthy ................ 704/257 |
| 2001/0041978 A1 | * | 11/2001 | Crespo et al. ............ 704/257 |

OTHER PUBLICATIONS

Weber, K., Multiple Timescale Feature Combination Towards Robust Speech Recognition, IDIAP Research Report, Dalle Molle Institute for Perceptual Artificial Intelligence, Valais, Switzerland, Sep. 2000.

Sharma, S. et al., Feature Extraction Using Non–Linear Transformation for Robust Speech Recognition on the Aurora Database, IEEE, 1117–1120, 2000.

Wu, S. et al., Incorporating Information from Syllable–Length Time Scales into Automatic Speech Recognition, International Computer Science Institute, Berkeley, CA.

(Continued)

Primary Examiner—Daniel Abebe
(74) Attorney, Agent, or Firm—McDermott Will & Emery LLP

(57) ABSTRACT

A phonetic data processing system processes phonetic stream data to produce a set of semantic data, using a context-free rich semantic grammar database (RSG DB) that includes a grammar tree, comprised of sub-trees, representing words and phrases. A phonetic searcher accepts the phonetic estimates and searches the RSG DB to produce a best word list, which is processed by a semantic parser, using the RSG DB, to produce a semantic tree instance, including all valid interpretations of the phonetic stream. An application accesses a semantic tree evaluator to interpret the semantic tree instance according to a context to produce a final linguistic interpretation of the phonetic stream, which is returned to the application.

30 Claims, 8 Drawing Sheets

OTHER PUBLICATIONS

Pols, L., Flexible, Robust, and Efficient Human Speech Recognition, Institute of Phonetic Sciences, Proceedings 21, 1–10, 1997.

Bourlard, H. et al., Towards Increasing Speech Recognition Error Rates, Speech Communication 18, 205–231, 1996.

Kingsbury, B., Perceptually Inspired Signal–processing Strategies for Robust Speech Recognition in Reverberant Environments, dissertation, University of California Berkeley, 1998.

Sharma, S., Multi–Stream Approach to Robust Speech Recognition, dissertation, Oregon Graduate Institute of Science and Technology, 1999.

* cited by examiner

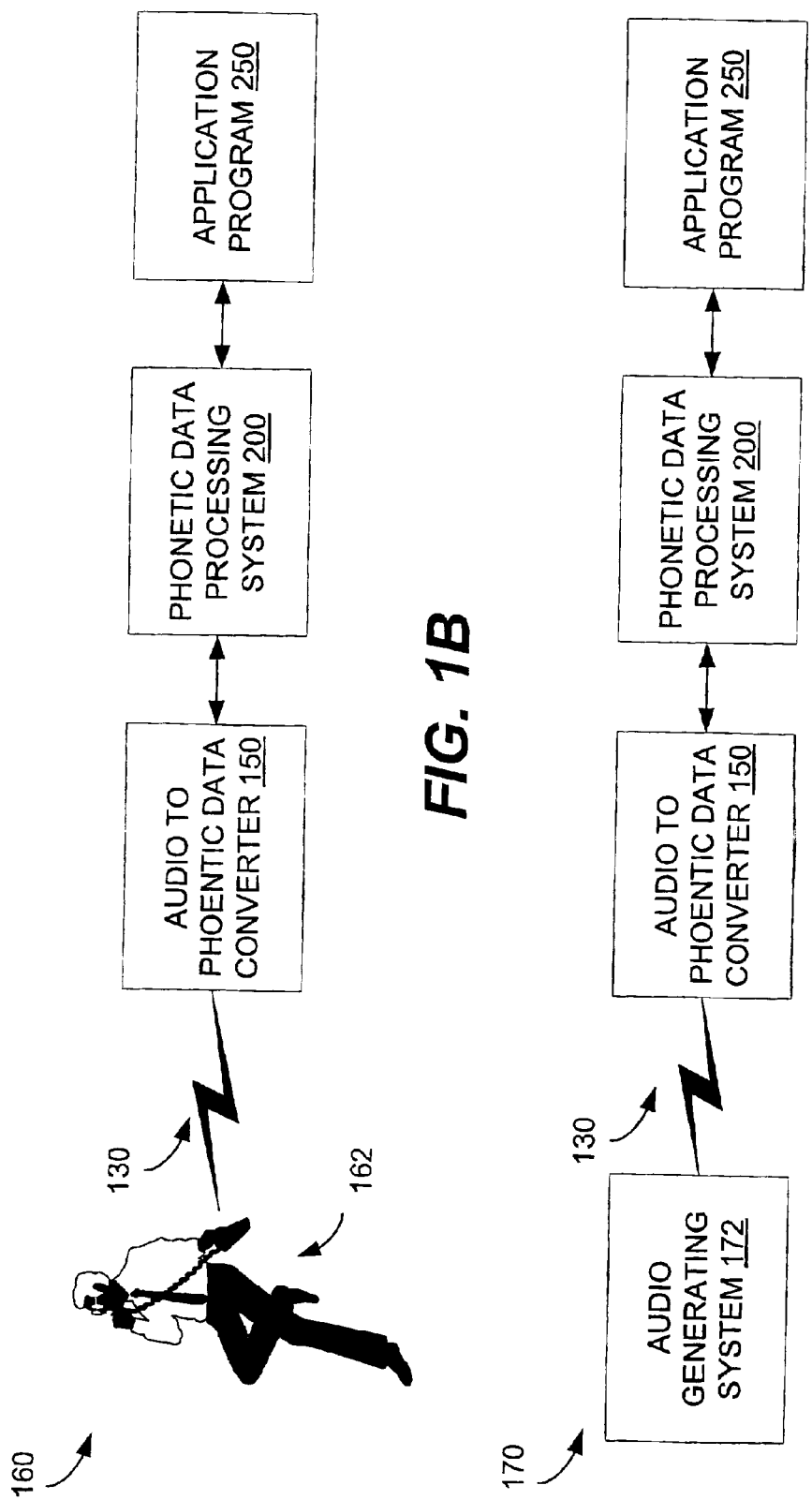

Illustrative Grammar Tree Form: For a context that includes a question (or prompt) pending response.

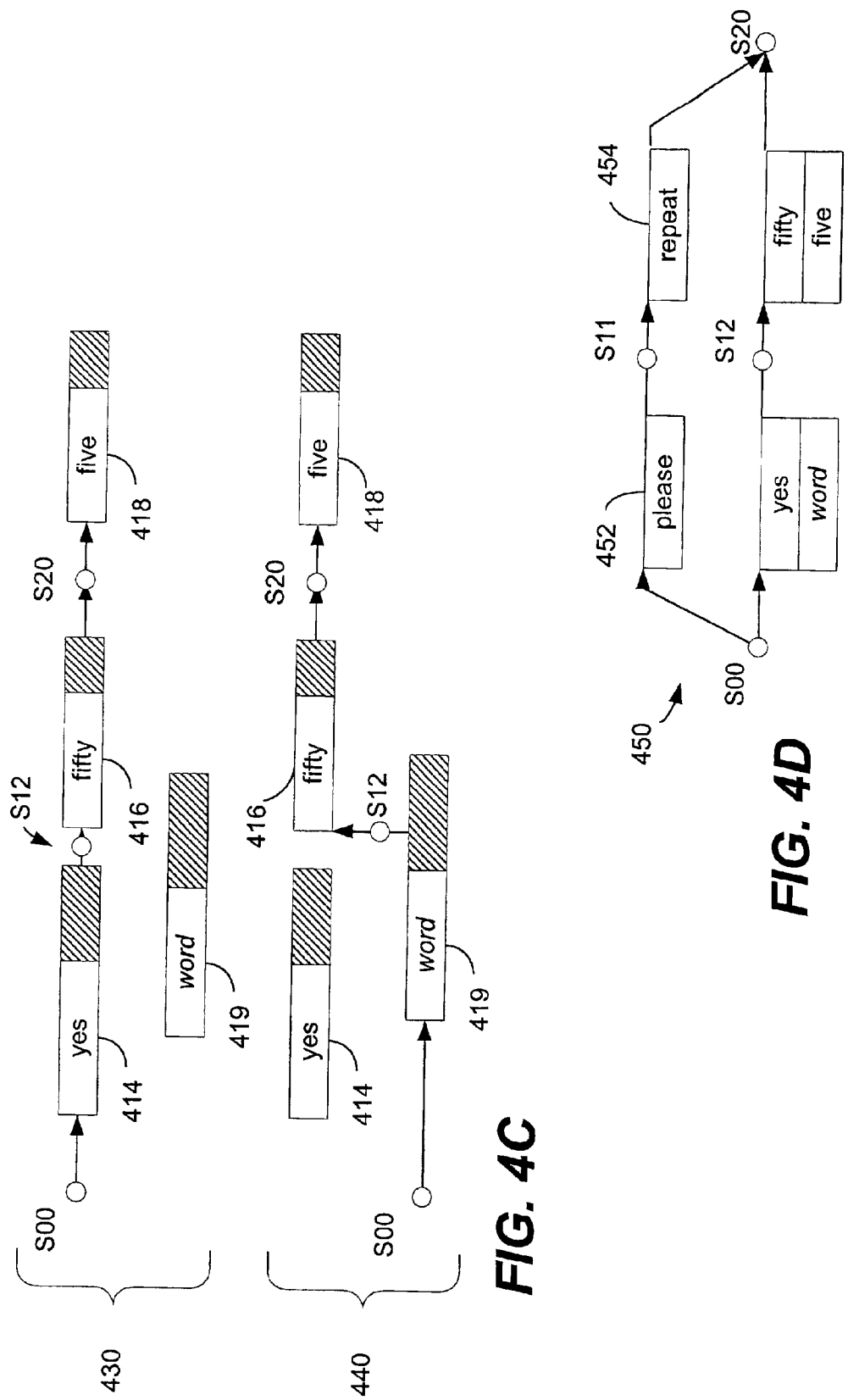

PHONETIC DATA PROCESSING SYSTEM AND METHOD

CROSS REFERENCE TO RELATED APPLICATIONS

This application claims the benefit of priority from commonly owned U.S. Provisional Patent Application Ser. No. 60/192,091, filed Mar. 24, 2000, entitled COMBINED SYNTACTIC AND SEMANTIC SEARCH, PARSING, AND APPLICATION ACCESS; U.S. Provisional Patent Application Ser. No. 60/191,915, filed Mar. 24, 2000, entitled SPEECH RECOGNITION APPLICATION TECHNOLOGY USING WEB, SCRIPTING AND SEMANTIC OBJECTS; U.S. Provisional Patent Application Ser. No. 60/192,090, filed Mar. 24, 2000, entitled A NOVEL APPROACH TO SPEECH RECOGNITION; and U.S. Provisional Patent Application Ser. No. 60/192,076, filed Mar. 24, 2000, entitled REMOTE SERVER OBJECT ARCHITECTURE FOR SPEECH RECOGNITION.

This application is also related to the following co-pending U.S. patent applications, the contents of which are incorporated herein in their entirety by reference:

"A NOVEL APPROACH TO SPEECH RECOGNITION", U.S. patent application Ser. No. 09/815,768;

"REMOTE SERVER OBJECT ARCHITECTURE FOR SPEECH RECOGNITION", U.S. patent application Ser. No. 09/815,808: and "WEB-BASED SPEECH RECOGNITION WITH SCRIPTING AND SEMANTIC OBJECTS", U.S. patent application Ser. No. 09/815,726.

FIELD OF THE INVENTION

The present invention generally relates to systems and methods for performing speech recognition. More specifically, the present invention relates to systems and methods for accepting phonetic data and generating semantic data corresponding to the phonetic data.

BACKGROUND OF THE INVENTION

With the proliferation of computer systems, an increasing amount of processing is becoming automated. At the same time, the processing power of such systems continues to evolve. To make use of this increasingly available processing capability, organizations are attempting to migrate functions historically performed by individuals, if at all, to automated systems. For instance, increasingly, computer systems are developed and used to engage humans via speech interaction. Some systems, as an example, are implemented to conduct interviews or surveys of individuals via a telephone, while other systems may interact with individuals without the use of a network. Additionally, as speech over the World Wide Web (the "Web") and the Internet (e.g., voice over IP) becomes more and more commonplace, one can assume that human-computer speech based interaction will be increasingly conducted using that medium.

One typical example of human-computer speech based interaction is survey systems, wherein a computer conducts an automated speech based survey of an individual over a telephone. In such a case, the survey system may have a scripted survey (i.e., series of questions) to be asked of the individual. The survey system may ask a first question, as a prompt, and await (e.g., for 5 seconds) a response by the individual. If the survey system does not receive a response, or receives a response that it can not interpret, the survey system may ask the question again or provide an instructional type of feedback. If the survey system receives a response that it can interpret, the survey system goes on to ask a next question or present a next prompt.

Such human-computer systems usually include an automatic speech recognition (ASR) system that converts incoming acoustic information into useful linguistic units, such as words or phrases. In a transactional ASR, for example one operating over a telephone network, there are a set of allowed words and phrases, which are defined by grammars. The process of sorting through the grammars for a particular word or phrase usage is referred to as syntactic search, wherein the words and their order are determined, typically based on probability. Such syntactic search subsystems typically evaluate a word using a fixed start point and a fixed end point, and process that data to determine the word with a related probability. However, this approach tends to be inefficient since the timeframe between start and end points may be adequate for some audio inputs, but inadequate for others, where some data beyond an endpoint may be cutoff and in other cases more time may be spent on a word than is required. Additionally, if not yielding results above a certain threshold probability, such systems may backtrack and continue to process the audio input to improve the phonetic estimates. Otherwise, the system may just put forth a best guess, albeit with low confidence.

In such systems, typically audio inputs, whether speech or background noise, are processed as valid speech, for the most part. That is, such systems do not usually maintain sufficient contextual knowledge about the expected response to eliminate extraneous noises (or "barge in"). As a result, such systems may attempt to interpret such noises as speech, thereby producing a result having embedded errors or rejecting the result altogether.

SUMMARY OF THE INVENTION

The present invention is a phonetic data processing system and method, configured to receive a phonetic stream and perform combined syntactic and semantic searching and parsing to produce a set of semantic data representing a plurality of possible valid responses, depending on a context based interpretation of the semantic data. An application program is configured to receive the set of semantic data and access a semantic evaluation tool to interpret the set of semantic data in accordance with context information. An application uses the semantic evaluation tool to evaluate the semantics of an utterance from different points of view, as desired for a particular application context. The present invention is configured such that all stages of processing are data feed-forward, with context-independent data streams.

The input phonetic data is a stream of phonetic estimates, typically derived from analysis of a waveform of an audio input. The input phonetic stream may be generated from real-time (or near real-time) data, stored data, or some combination thereof. Although the advantages of the efficiency and accuracy of the present invention are most apparent with real-time or near real-time data, the present invention is useful with any received phonetic data. As an example, the present invention is particularly useful with human-computer interactive systems (or automatic speech recognition (ASR) systems), wherein the ASR system determines its next prompt as a function of the interpretation of the audio input of the human in response to a preceding prompt. Additionally, the present invention may also be useful in computer-computer interactive systems, where two or more computers exchange audio or phonetic stream data, or some combination thereof.

The functionality of the present invention may be embodied in software, hardware, middleware, firmware, or some combination thereof. As examples, such functionality may take the form of a standalone application, a companion application, an application plug-in, or tools. The functionality of the present invention may be executable on, or accessible by, one or more of a personal computer, server, workstation, an audio enabled personal digital assistant (PDA), a cellular telephone or others of such devices, including Web enabled devices. As will be appreciated by those skilled in the art, the foregoing list merely provides examples, and is not intended to be an all inclusive list of devices or otherwise limiting in any manner.

The Functionality of the present invention may be hosted on a single device or distributed in any of a variety of manners among several devices. Such devices may be networked together or accessible over any of a variety of networks such as the Internet, World Wide Web ("Web"), intranet, extranet, local area network (LAN), wide area network (WAN), private network, virtual network, virtual private network (VPN), telephone network, cellular telephone network, cable network, or some combination thereof, as examples. When implemented in a Web setting, the present invention may be implemented using Web-based technologies, such as by scripting a transactional application system within the context of a Web page, as described in co-pending U.S. patent application Ser. No. 09/815,726, incorporated herein by reference.

A phonetic data processing system in accordance with the present invention includes functionality to perform phonetic searching, semantic parsing and tree generation, semantic tree evaluation, and outputting of semantic data adapted for application code utilization, given an input stream of phonetic data. This functionality may be embodied in certain modules, which are preferably designed for context-independent, feed-forward data flow. Context independence means that the data output from one module can be interpreted correctly in any context, e.g., in various grammar contexts or categories. Feed forward means that the data flows in the forward direction only, i.e., there is no need to go back and re-work the data. This approach simplifies and generalizes the search and evaluation functions. The benefits of this approach include radically reduced processing times, while achieving increased accuracy.

The present invention performs syntactic and semantic processing using a rich semantic grammar (RSG) database (DB), which provides a source of word and grammar knowledge used to interpret the phonetic data. The grammars applied to a certain phonetic stream will vary depending on the expected response, which is typically a function of a prior prompt. The RSG DB includes a database of words and grammar rules related to the words, that is, including both syntactic and semantic data. The relationships include paradigms for combining words into meaningful phrases according to a given context. The RSG serves as a common, root grammar for the syntactic and semantic processing, which may each use its own representation of the RSG for its respective processing tasks. As a result, compatibility is ensured, since the semantic stages of processing will never receive an illegal word string, for example, from the syntactic processing stage. Additionally, to achieve greater efficiency, when multiple semantic phrases have the same syntax, a collapsed representation of the RSG can be used for searching.

The grammars of RSG DB are organized as a tree of classes, as nodes, that represent words and phrase structures. A grammar tree may include a plurality of trees (or sub-trees). Generally, the RSG DB is context-free, because the rules applied to each sub-tree operate independently of the other parts of the tree. That is, each class (or node) includes rich semantic information (e.g., a semantic description) and a syntactic description. For purposes of syntactic searching and analysis, the RSG DB is represented as an optimized context free grammar (CFG) DB, where the grammars do not include the semantic information, but rather only include syntax information used to generate word lists. This stripped down version of the RSG DB allows for more efficient syntactic analysis.

The syntactic description includes a list of alternatives or sequences. Each sequence may be a list of items, where the items may be either words or other class instances. Each class also has an optional semantic description that includes a list of semantic attributes. Each semantic attribute may be a value, a category, an operator, or a tree of such things. Attribute values are specific items, such as the number 3, that have meaning when interpreted at run time. Categories are symbols, possibly with values, that mark the path for future semantic interpretation. Operators control the combination of class instances and provide a powerful, extensible, and general technique for semantic evaluation. Note that any given class may have, and may be interpreted in accordance with, multiple categories. These categories control different semantic interpretations of the same class instance. Collectively, the categories describe all possible valid interpretations of the class. Because all classes are context free, they may be re-used and reinterpreted in accordance with different contexts. For example, a class representing the numbers from 20–99 may be reused in several instances where there is a phonetic input corresponding to a number.

A phonetic search module is configured to receive input phonetic data and generate a corresponding best word list (including word paths) using syntactic analysis. Typically, the input phonetic data will be in response to a prompt. The prompt is provided (e.g., a question) is asked) within a given context, so a response within a certain realm of responses is expected according to that context. The phonetic search module includes a phonetic search algorithm (PSA) used to search the CFG DB for the best matching words and/or phrases corresponding to the phonetic stream input and the grammars associated with the context. The PSA is a two-layer search algorithm, working like a phrase spotter with skips. The first layer converts the incoming phonetic data, comprised of sonotypes, into sequences of words, generating only the ones allowed by currently active grammars. A sonotype is a phonetic estimate of a syllable or word.

To "spot" words from the received phonetic stream, the phonetic search module applies word models to the sonotypes and score restrictions. In the present invention, each sonotype is represented along a timeline as having a first portion that represents the phonetic information starting at a start time and then concluding at a first end time and having a first score. A second portion begins at the first end time and ends at a final end time and includes additional phonetic information derived from the original audio input. Therefore, unlike prior systems, the end times for each sonotype are not fixed. Each end time corresponds to a point in time that the speaker may have finished uttering the given sonotype, and will yield a different score representing the probability that the utterance was a certain word. For example, tile word "yes" may be modeled and include one start time and six different end times, each end time having a different score associated therewith. Applying the word model to the first group of minimum phonetic information (i.e., from start time to the first end time), yields a word (or syllable) result with a certain score. Applying the word model to a second group of phonetic information (i.e., from start time to a second, later end time) yields a different score. Using this modeling, a set of words is determined.

While the first layer of the PSA generates words, the second layer of the PSA search algorithm includes a grammar builder that connects consecutive words, represented as segments, into grammar instances that define word paths. For example, a word path may be (start) yes-I-do (end), where each word is a sonotype. The word "yes" may he the first word segment in a path and the words "I" and "do" may follow as subsequent segments. The process of connecting word segments into phrases is accomplished as a further function of the word representations mentioned above, with a plurality of possible end times. In accordance with the rules implemented in the present invention, a first word segment can only be connected with a second word segment if the second word begins after conclusion of the first word. Given the possibility of multiple end times for a given word representation, the second word may start after a first (i.e., earlier) end time and prior to a second (i.e., later) end time. In that case, a connection between those word segments can exist. In the case where the second word begins prior to the first end time, a connection can not exist. By making these connections and combining segments, word paths are formed by the grammar builder. The output of the grammar builder is referred to as a best word list, which includes the words and paths, referred to as sequences. That is, for a given word list, many word paths and sequences of those words may be possible.

A semantic parser module builds a semantic tree instance from the best word list, using the complete RSG DB, rather than the CFG DB. The RSG DB includes semantic information not found in the CFG DB. The semantic tree instance includes the words and also the structure of data, including semantic "decorations" (e.g., attributes) of the semantic tree instance. An algorithm of the semantic parser module matches each word in the best word list to a word in a phrase from the active grammar of the RSG DB. The algorithm works recursively and builds the semantic tree instance step-by-step as it interprets each word and path in the best word list. The resulting semantic tree instance is not a word list with a set of semantic tags, but rather a complete semantic tree comprised of nodes represented as classes. The semantic tree instance includes both generic semantic information and application specific information. When finished, the final semantic tree instance embodies many possible representations of the tree nodes. That is, the semantic tree instance is context free, so can be interpreted in a variety or ways to produce one of a variety of results.

The semantic tree instance is passed to an application that serves as the underlying transactional component of the system. In other words, the application is the module that defines and administers the prompts (e.g., questions), uses the responses, and provides overall session management. The application is configured to accept the semantic tree instance and access a semantic tree evaluator to have the semantic tree instance interpreted in accordance with a context defined by the application. Certain categories will be relevant given the context.

Since the semantic tree instance is context free, it can be interpreted in accordance with a variety of contexts (and categories) to produce one of a variety of results. Applying the proper context allows the proper category to be determined, which ensures the semantic tree instance is interpreted to produce the proper result. Upon receipt of the semantic tree instance and context information from the application, at each node, the semantic tree evaluator applies the context to determine the applicable category and then interprets semantic data at that node according to the category. The semantic tree evaluator performs a recursive tree traversal, proceeding from the top-down, and only goes as deep within a node as is necessary to determine the proper category for the given node (the "solution" node). The context information reflects the expected responses and conceptually may be thought to include a set of questions, i.e., "Is the response a number?". If the semantic tree evaluator finds the word "fifty", as an example, at the top level of the solution node, the semantic tree evaluator will not process the remaining levels to determine that the number category is to be applied to that node. Accordingly, the semantic tree evaluator returns the appropriate category, if possible, and interprets the class to obtain a value.

If the category cannot be determined, then the semantic tree evaluator returns the concatenation of the sub-tree values for that node. If the semantic tree evaluator finds an operator at the solution node, a default operator is replaced with the true operator. The interpreted semantic data forms a linguistic result that is returned to the application program, which then determines is next prompt as a function of the returned semantic data.

BRIEF DESCRIPTION OF THE DRAWINGS

The foregoing and other objects of this invention, the various features thereof, as well as the invention itself, may be more fully understood from the following description, when read together with the accompanying drawings, described:

FIG. 1B, FIG. 1C and FIG. 1D are block diagrams of illustrative systems within which the phonetic data processing system may be used;

FIG. 4C and FIG. 4D are diagrams depicting word connections and sequences in accordance with the present invention.

For the most part, and as will be apparent when referring to the figures, when an item is used unchanged in more than one figure, it is identified by the same alphanumeric reference indicator in all figures.

DETAILED DESCRIPTION OF THE PREFERRED EMBODIMENT

The present invention is a phonetic data processing system and method, configured to receive a phonetic stream and perform combined syntactic and semantic searching and parsing to produce a set of semantic data representing a plurality of possible valid responses, depending on a context based interpretation of the semantic data. An application program is configured to receive the set of semantic data and access a semantic evaluation tool to interpret the set of semantic data in accordance with context information. The semantic evaluation tool produces and returns to the application program a linguistic result, such as a final word or phrase interpretation of the input phonetic stream. The present invention is configured such that all stages of processing are data feed-forward, with context-independent data streams. The input phonetic stream may be generated from real-time (or near real-time) data, stored data, or some combination thereof. Although, the advantages of efficiency and accuracy of the present invention are most apparent with real-time or near real-time data.

Figure 1A:
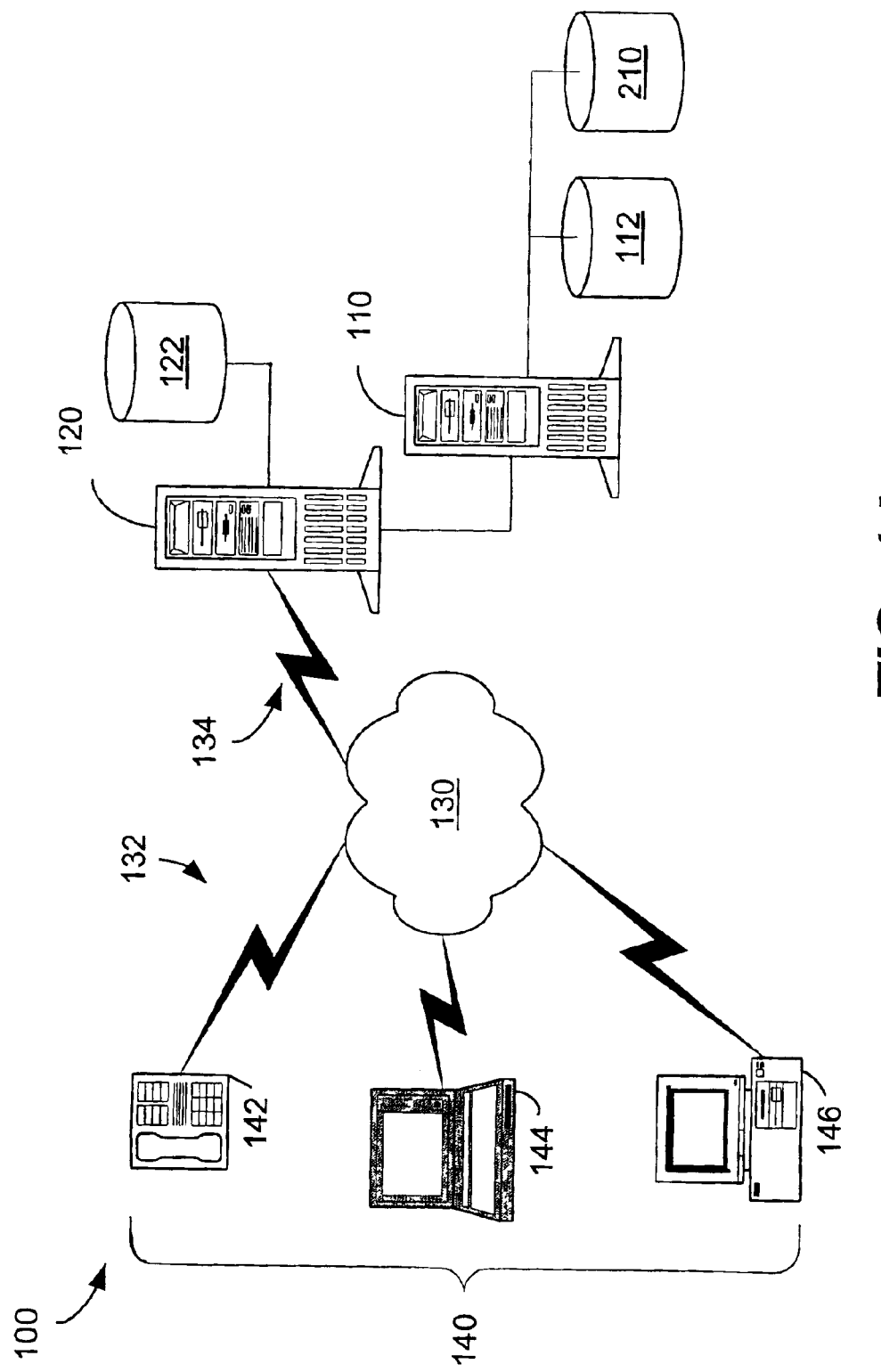
FIG. 1A is a representative architecture upon which the phonetic data processing system of FIG. 2A and FIG. 2B may be implemented.

The phonetic data processing system may be implemented on any one or more of a variety of devices and networks. FIG. 1A shows one possible architecture 100 on which the present invention may be implemented. A phonetic data processing system 200 (see FIG. 2A and FIG. 2B) is preferably implemented as computer program modules that may be, for example, hosted on phonetic data processing server 110, having access to an associated database (e.g., the RSG DB 210 of FIG. 2A) and a second DB 112 for other server, operating system, or application data or code. A network server 120, and associated DB 122, may provide an interface (e.g., a Web interface, telephone network interface, etc.) between the phonetic data processing server 110 and a network 130 (e.g., the Web, Internet, telephone, etc.). The various devices may access network 130 via one or more of a variety of types of links, such as links 132 and 134. These links may include LANs, WANs, VPNs, telephone networks, or some combination thereof, as examples. Input, such as audio input, may be provided via any of a variety of devices 140, such as a standard telephone (including cellular telephones) 142, a laptop computer 144, or a desktop computer 146, as well as other audio enabled devices (e.g., personal digital assistants). As examples, devices 140, server 120, or server 110 may include modules configured to generate phonetic streams of data from audio inputs.

As one example, the present invention is particularly useful with human-computer ASR systems 160, as is shown in FIG. 1B. In the embodiment of FIG. 1B, a human 162 using a telephone ultimately interacts with an application program 250 (as part of an ASR system). The audio input of user 162 received by the telephone is transferred, via network 130, to an audio-to-phonetic data converter 150, which outputs a phonetic stream of data to the phonetic data processing system 200. As will be described in greater detail below, the phonetic data processing system 200 generates, from the received phonetic stream (and thus the input audio), semantic data in the form of a semantic tree instance and provides that data to the application program 250. The application program 250 accesses a semantic evaluator tool, within the phonetic data processing system 200, that interprets the semantic tree instance according to a context and returns a linguistic result to the application program, which then determines a next application prompt as a function of the linguistic result.

Figure 1D:
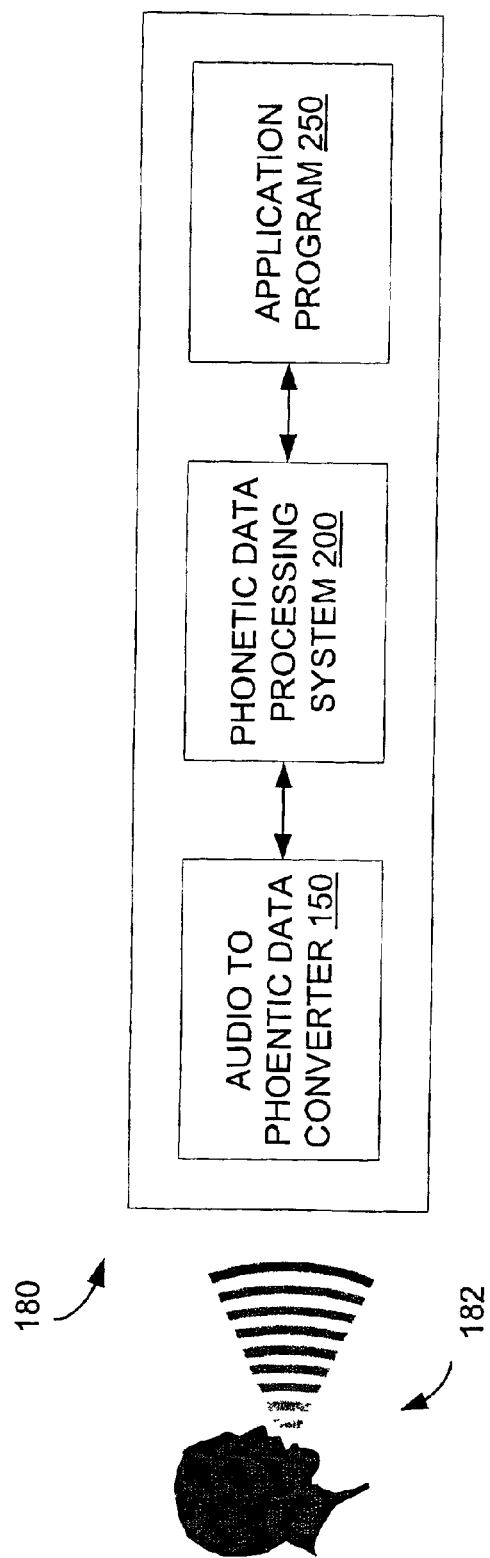

Additionally, the phonetic data processing system of the present invention may be useful in computer-computer interactive systems, such as the system 170 shown in the embodiment of FIG. 1C, where two or more computers exchange audio or phonetic stream data. In FIG. 1C, an audio input is generated by an audio generating system 172. In FIG. 1D, a system 180 is shown where communication by an individual 182 is not via a network, but rather is directly with system 180. Systems that may use such human-to-computer speech may include automated teller machines, drive-up interactive systems, PCs and so forth. Generally, the phonetic data processing system 200 may service the embodiments of FIG. 1B, FIG. 1C and FIG. 1D independently or simultaneously, or other audio or phonetic stream generating systems not depicted herein.

Figure 2A:
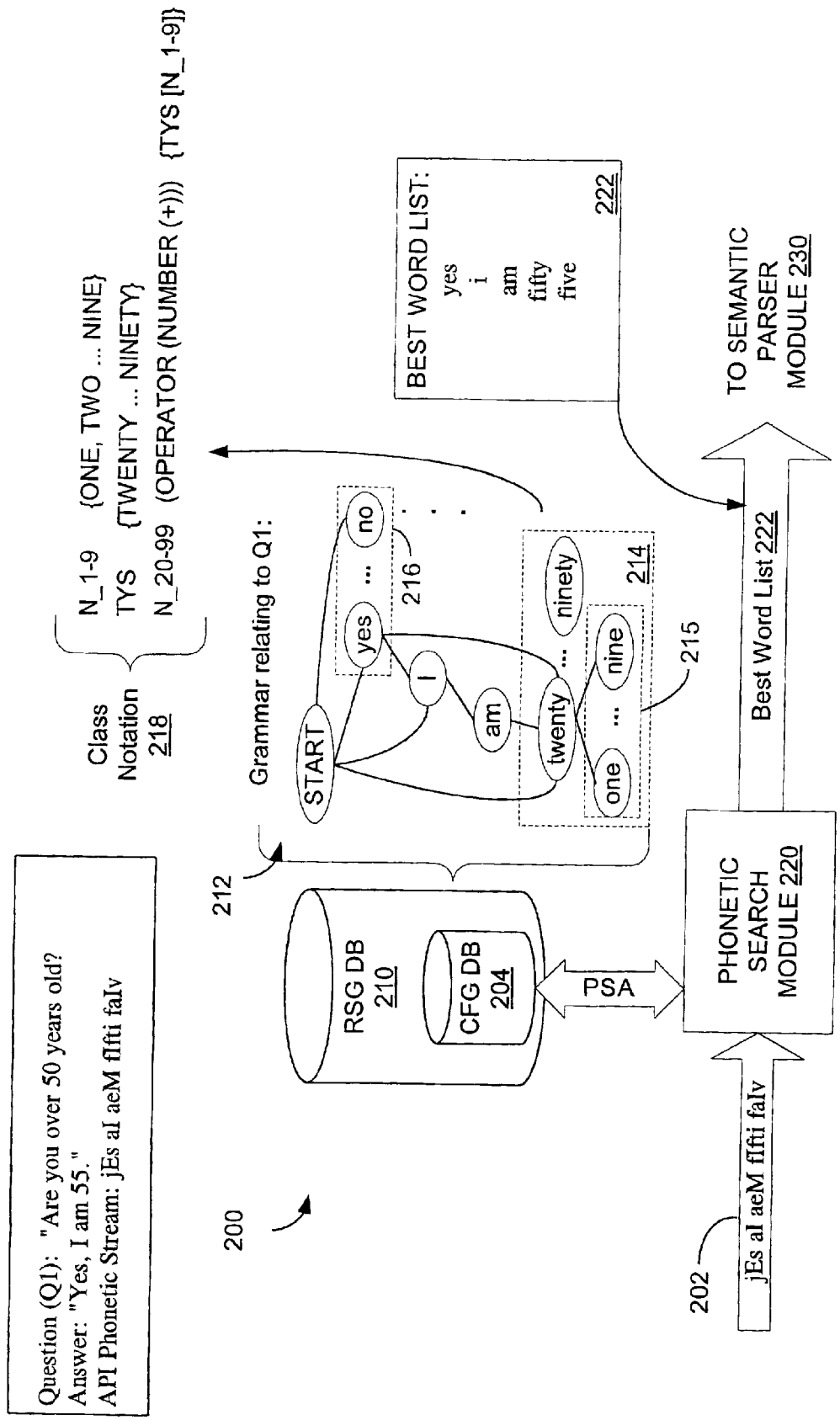
FIG. 2A and FIG. 2B provide a block diagram and processing flow of various functional modules included in a phonetic data processing system in accordance with the present invention.
Figure 2B:
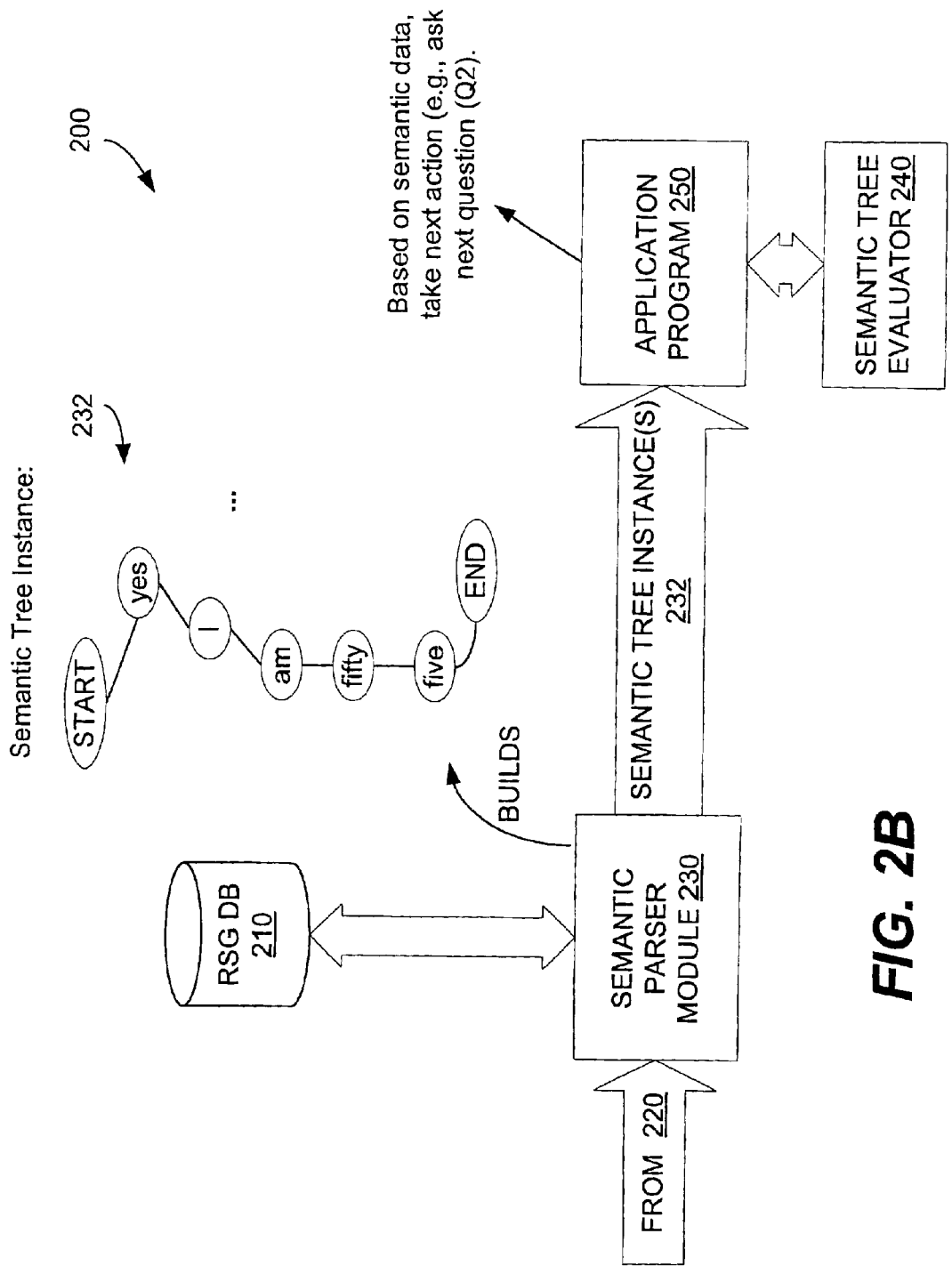

For illustrative purposes, the present invention is described with respect to a computer system that interacts with an individual over a network. For example, the computer system may include a survey application system configured to administer customer service surveys and the network may include a telephone network. FIG. 2A and FIG. 2B show a processing flow among several modules comprising a phonetic data processing system 200 in accordance with the present invention. The phonetic data processing system 200 includes a phonetic search module 220, a semantic parser module 230, and a semantic tree evaluator module (or tool) 240 that service an application program 250. A rich semantic grammar (RSG) database (DB) 210 provides the knowledge component for both syntactic and semantic processing performed by the phonetic search module 220 and the semantic parser module 230. Given an input phonetic stream 202, the phonetic data processing system 200 outputs to application program 250 a semantic tree instance 232 representing all possible valid interpretations of the input phonetic stream. Application program 250 provides the semantic tree instance and a context to the semantic tree evaluator module 240, which returns a valid linguistic interpretation of the semantic tree instance to the application program. The application program 250 may be an application code configured to present certain survey questions to an individual and to process the interpretations provided by the semantic evaluator 240.

In the preferred form, all stages of processing are data feed-forward, with context-independent data streams. This simplifies and generalizes the language search and language analysis functions of the phonetic data processing system, while radically reducing application development time and providing increased functionality. Each module (i.e., 210, 220, 230, and 240) may serve as a standard tool to an application program. Context independence means that the data output from one module (e.g., phonetic search module 220) can be interpreted correctly in any context, so there is no need to go back and re-work the data for any of the other modules. Feed forward means that the data flows in the forward direction only. This capability also provides structural and system advantages, such as providing the ability to separate and encapsulate modular high-level functions, keeping these functions separate from the application framework. That is, the high-level functions remain independent of implementation details of specific sub-functions and algorithms of the application. As a result, there exists the capability to use different implementations, technologies, hardware and system configurations, all within the same system architecture.

Rich Semantic (Context Free) Grammar DB

The RSG DB 210 provides the knowledge component and structure for both syntactic and semantic processing. This knowledge structure is provided, in the preferred form, as a plurality of grammars used by the phonetic data processing system modules to, ultimately, derive a semantic (or linguistic) code representation 242 of the input phonetic stream 202 and, thus, the original input audio content. Generally, a grammar embodies a set of words and rules for combining the words into meaningful phrases. As such, the grammar provides a framework within which the phonetic stream 202 is interpreted. For purposes of syntactic searching and analysis, the RSG DB 210 is represented as an optimized context free grammar (CFG) DB 204, where the grammars do not include semantic information, but rather only include syntax classes that are used to generate word lists. This stripped down version of the RSG DB allows for more efficient syntactic analysis.

The RSG serves as a common, root grammar for the syntactic and semantic processing, which may each use its own representation of the RSG for its respective processing tasks. As a result, compatibility is ensured, since the semantic stages of processing will never receive an illegal word string, for example, from the syntactic processing stage. Additionally, to achieve greater efficiency, when multiple semantic phrases have the same syntax, a collapsed representation of the RSG can be used for searching.

Figure 3:
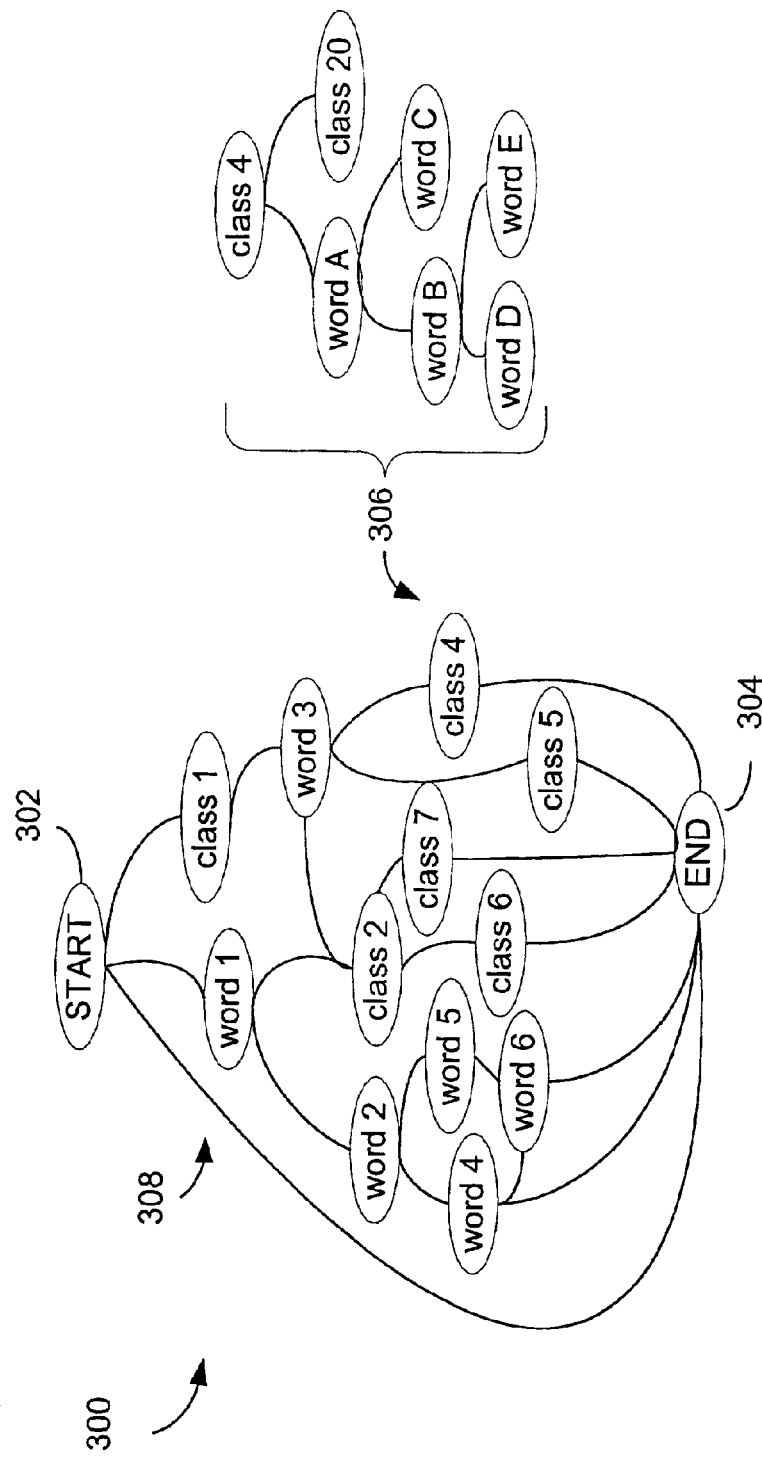
FIG. 3 is representative grammar tree used by the modules of FIG. 2A and FIG. 2B.

FIG. 3 shows an embodiment of a form of a grammar tree 300 in accordance with the present invention. A plurality of grammar trees may be defined and applied in different contexts. This plurality of grammar trees may be combined into a master grammar tree, wherein each of the grammar trees may be considered a sub-tree of the master grammar tree. Furthermore, each sub-tree, may be comprised of a plurality of subordinate grammar trees. Each grammar tree (or sub-tree), such as grammar tree 300, may be considered to have a start 302 and an end 304. Between the start 302 and end 304 exists a plurality of paths comprising a plurality of nodes, which together form the grammar tree. The grammar is context-free because the rules that can be applied to each node or sub-tree operate independently from the other parts of the tree. The choice of grammar trees applied reflects a certain set of possible responses to a prompt, so are chosen according to a certain context. That is, the phonetic data processing system 200 may be biased to focus processing on a certain one or more sub-trees in anticipation of a response to a prompt likely to fall within those sub-trees. This approach expedites processing.

In the illustrative embodiment, the phonetic data processing system 200 is primarily implemented in an object oriented design (OOD) language, such as Java. And, each node in grammar tree 300 is a "class". In addition to being context-free, and as a benefit of the nature of OOD, rich semantic information is located at the tree nodes, although not included in the CFG DB 204. That is, each class may contain words, numbers, rules, operators, other classes, and so forth. In some instances, a class may merely represent a word, such as at node 308 of FIG. 3, where the node is indicated as "word 1". As an example of a possible class composition, class 4 306 is expanded in FIG. 3 to show that it is comprised of words A–E and class 20. Words A–E may represent values of a string variable (e.g., a list) in class 4, for instance.

Each class contains an optional semantic description and a syntactic description. In the preferred form, the notation is:

Class-name (Semantic Description) {Syntactic Description}

Generally, syntax refers to order, while semantics refers to meaning. In the above class notation, the syntactic description is a list of sequences, where each sequence is a list of items, where the items may be either words or other classes, as described with respect to class 4 306 above. As an example, a list of three alternative sequences may include:

a. yes-I-am-fifty-five
b. I-am-fifty-five
c. yes-fifty-five

The optional semantic description comprises a list of semantic attributes, that is: (attribute1, attribute2, ...). Each semantic attribute may be a value, a category, an operator, or a tree of such things. Values are specific items, such as the number 3, that have meaning when interpreted at run-time. Categories are data types (e.g., numbers, digits, etc.), possibly with values. Categories mark the path for eventual semantic interpretation, by indicating how the values at nodes are to be evaluated or combined. Operators, which include "and", "or", and "not", control the combination of classes or attribute values. Operators provide a powerful, extensible, and general technique for semantic evaluation. The attributes have a very general or loose structure, in order to allow flexible and specific interpretation by applications. That is, very little is defined at this level, the specific definitions are defined for specific applications. Note that any given class may be interpreted in accordance with any one of multiple categories. Collectively, the categories describe all possible valid interpretations of the class (e.g., digit, number, string). Because all contexts are accommodated (i.e., being context free), each class can be used and re-used in a context-independent manner, yielding different results as the categories called for by each context are determined and applied.

As an example, to define a class the relevant lexical (i.e., dictionary) entries are listed, along with any required classes. The semantic description comes first, and is contained in the parentheses. The syntactic description is second, and is contained in the braces. Alternative syntactic sequences are separated by commas. The square brackets denote optional list-item values, as illustrated below.

Lexical Entries:

| | | |
|---|---|---|
| THREE | ( value ( number ( 5 ), digits ( 5 ) ) ) | { five } |
| FIFTY | ( value ( number ( 50 ), digits ( 50 ) ) ) | { fifty } |
| Classes: | | |
| N_1–9 | { ONE, TWO, THREE, FOUR, FIVE, SIX, SEVEN, EIGHT, NINE } | |
| TYS | { TWENTY, THIRTY, FORTY, FIFTY, SIXTY, SEVENTY, EIGHTY, NINETY } | |
| N_20–99 | ( operator ( number ( + ) ) ) | { TYS [ N_1–9 ] } |

Therefore, assume the phrase "fifty five" was part of the response to a prompt "How old are you?", for example. According to the active, context free grammars, the phonetic estimate "fIfti faIv" can be interpreted as a number or as a digit, which are categories. In this case, it is interpreted using the class N_20–99, which includes the classes N_1–9 and TYS. Within class N_20–99, the "+" operator is used to combine a value from the class N_1–9 (e.g., 5) with a value from the class TYS (e.g., 50). According to class N_20–99, "fIfti faIv" is to be interpreted in the number category, and not the digit category. Therefore, "fIfti faIv" would be interpreted to be "fifty five", which would be determined by this class to mean number value of "fifty" + the number value of "five". The result would be the number value 55.

However, now imagine a context where we need to interpret the phrase as a digit string, and not in the number category. In such a case, the + operator would not be used as a mathematical operator, and the phrase would be interpreted as digit value of "fifty" followed by digit value of "five", which is the digit sequence "505". Obviously, this is quite a different result. Accordingly, maintaining knowledge (e.g., context information) related to the expected result when interpreting semantic data ensures the proper category is applied. The application of grammar tree 300, contexts and categories to a given input may be more fully appreciated with the discussion of the modules of the phonetic data processing system below.

Phonetic Search Module (& Algorithm (PSA))

Turning to the phonetic data processing system embodiment 200 of FIG. 2A and FIG. 2B, assume the implementation of FIG. 1B where an individual 162 is being administered a survey by an application program 250 using the phonetic data processing system 200 of the present invention. For illustrative purposes, assume that as a prompt, the question (i.e., Q1) "Are you over 50 years old?" was asked. In response, individual 162 responded "Yes, I am 55." As a result, an audio-to-phonetic data converter 150 passes a phonetic stream of data "jEs aI aem fIfti faIv" 202 to the phonetic search module 220. Each syllable or word (e.g., jEs) is a "sonotype". From this input, the phonetic search module 220 implements a phonetic search algorithm (PSA) to find a best word list corresponding to the string of sonotypes. This best word list includes words and there connections to form word paths, which embody word sequences.

In the preferred form, the PSA is a two-layer search algorithm, working like a phrase spotter with skips. That is, phonetic insertions (e.g., background noise mixed into the audio response of individual 162) between any two words are capable of being detected and eliminated during processing. The first layer of the PSA converts the incoming sonotype stream into a set of words, generating only the words allowed by currently active grammars, thereby eliminating background noise or barge-in. Note that grammars (or sub-trees) will vary depending on the currently expected response, or context. The second layer of the PSA connects words into grammar instances, defining word paths, using a grammar builder.

Figure 4A:
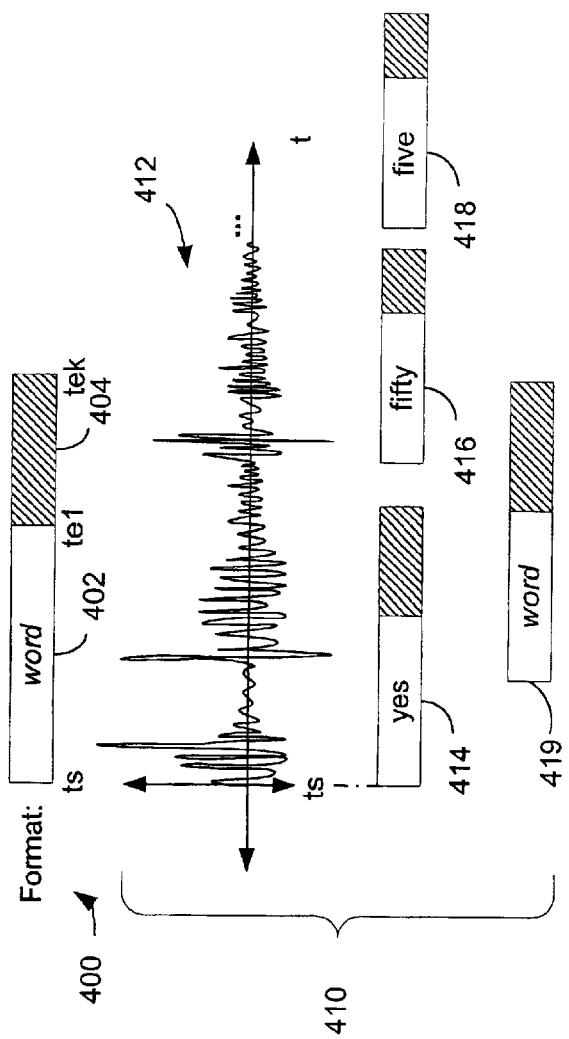
FIG. 4A is a diagram of word representations in accordance with the present invention.

For each incoming phonetic estimate, if possible, a corresponding word is determined. Referring to FIG. 4A a word may be represented by word format 400. This format is related to the audio energy received. A first portion 402 of the word format represents the word, given a fixed start time (ts) and an earliest possible end time (te1). A second portion 404 of the format includes additional audio information, and begins at the first end time (te1) and concludes at the last possible end time (tek), with intermediate end times. Each end time may have a different probability score associated therewith, since each subsequent end time allows more of the audio information to be used to determine the word.

Figure 4B:
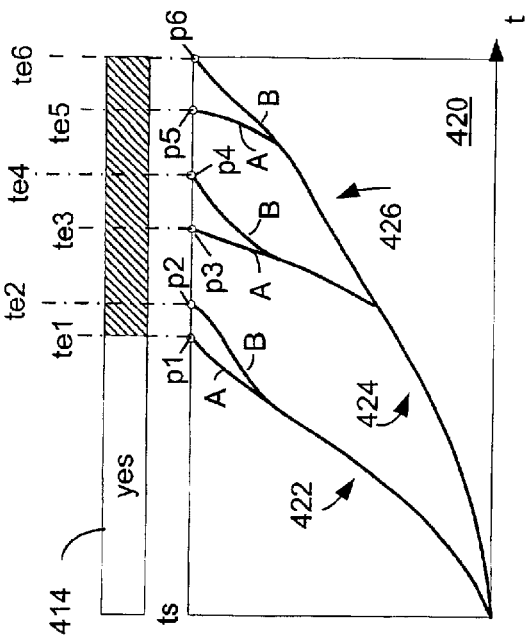
FIG. 4B is a word model diagram corresponding to the word representations of FIG. 4A.

Arrangement 410 shows a plot of audio energy 412, as an example, associated with the phrase "yes-fifty-five" uttered by an individual, represented as yes 414, fifty 416, and five 418. A background noise, such as a word spoken by another and picked up by the audio receiver, is represented as word 419. Each word is determined by applying word models relating to the content of the audio information as a function of time (t), referred to as "word spotting". For example, FIG. 4B shows a word model 420 associated with the utterance of the word "yes" 414 in FIG. 4A. Word 414 starts at a fixed start time ts, but has several end times, te1–te6, and each end time may correspond to a different "score". End time te1 represents the earliest time the word "yes" can be determined from the corresponding audio energy, above some minimum threshold of probability. Each subsequent time may have different probability scores. Word model 420 include several paths 422, 424, and 426. Each word path begins at the fixed start time ts and ends at different end times, with a different score at each time. For example, word path 422A has scores p1, word path 422B has score p2, word path 424A has score p3, word path 424B has score p4, word path 426A has score p5, and word path 426B has p6. The probability score is the likelihood that a phonetic estimate is a given word represented in the CFG DB 204. The first layer of the PSA searches the CFG DB 204 to generate a list of words used by the second layer of the PSA, the grammar builder, to form word sequences.

While the first layer of the PSA generates words, the second layer of the PSA search algorithm includes a grammar builder that connects consecutive words, as segments, into grammar instances that define word paths that each define a sequence of words. The grammar builder uses a dynamic programming (DP) algorithm to build the word paths using the CFG DB. Each word path may be comprised of a plurality of segments. That is, each word may be represented by a segment that can be connected to other segments at connections points (e.g., S00 to S10). For example, a word path may be (start) yes-fifty-five (end), where each word is represented in the phonetic stream as a sonotype and represented in a sequence or word path as a segment. The word "yes" may be the first word in a first segment of a path and the words "I" and "do" may follow in subsequent segments.

The process of connecting words, or segments, into phrases is accomplished as a further function of the word representations mentioned above, with a plurality of possible end times. In accordance with the rules implemented in present invention, a first word can only be connected with a second word to form a segment if the second word begins after conclusion of the first word. Given the possibility of multiple end times for a given word representation, the second word may start after a first (i.e., earlier) end time and prior to a second (i.e., later) end time. In that case, a connection between those words can exist. In the case where the second word begins prior to the first end time of the first word, a connection can not exist. By making these connections, word paths are formed by the grammar builder.

Referring to FIG. 4C, applying the rules above, two possible word connections are possible. A first sequence 430 includes a segment starting at S00 with the first word 414, i.e., the word "yes", having an earliest end time te1 coming after the start time of a subsequent word 419. Therefore, in sequence 430 the segments including word 414 and word 419 cannot be connected. However, word 414 does have an end time prior to the start of word 416 (i.e., fifty), so the segments for word 414 and word 416 can be connected at connection point S12, between points S00 and S20. The word five 418 also begins after the word fifty 416 ends, so there is also a connection between the segments including words 416 and 418.

Another valid sequence 440 can also be derived from the same phonetic data, assuming a valid word was determined for word 419. If a valid word has not be determined from word 419, the word may be ignored or extracted out. If a valid word has been found for word 419, the segment including word 419 still can not be connected to the segment connecting including word 414, since word 419 begins before the earliest end time of word 414. However, word 419 does have at least one end time prior to the beginning of word 416, which is at connection point S12. Therefore, the segments for the words 419 and 416 can be connected.

FIG. 4D shows a partial set of valid segments related to phonetic data 412 shown FIG. 4A. Between connection points S00 and S20 there can be several sequences. For example, a sequence "please-repeat" may be one valid sequence, or partial sequence. And, with respect to FIG. 4C, the sequences yes-fifty, word-fifty, yes-five, and word-five may be formed, along with other possible sequences.

Referring once again to the example of FIG. 2A, a grammar 212 relating to the question Q1 exists in RSG DB 210. A class 214 corresponding to numbers 50–99 exists as a node having the class notation 218. Class 214 may include a class 215, representing numbers 1–9. Another class 216 may also be defined including "yes" and "no" values. Given the phonetic stream of "jEs aY aem fIfti faIv" 202, the phonetic estimate "jEs" is first evaluated by the phonetic search module 320 using the PSA, as described above. The word "yes" corresponds to "jEs", so a segment with the word "yes" is begun, by applying grammar tree 212 (and any other active grammars). Accordingly, segments beginning with "no" are not considered. Generally, a set of valid sequences may be started with "yes," including:

a. yes
b. yes-I-am
c. yes-I-am-fifty
d. yes-I-am-fifty-one (and so forth, up to 99)
e. yes-fifty
f. yes-fifty-one (and so forth, up to 99)

Evaluating the next phonetic estimate, i.e., "aI", a segment with the word "I" is appended to the segment with the word "yes". Accordingly, a valid set of sequences may now include:

a. yes-I-am
b. yes-I-am-fifty
c. yes-I-am-fifty-one (and so forth, up to 99)

In this manner, segments are combined and, when done, a resulting best word list 222 is formed that includes words and word paths, which include the segments that make up each sequence.

Note that the PSA obtains the syntactic structure it needs from the syntactic CFG DB 204 component of the RSG DB 210. Also, because the DP algorithm is used only inside a contiguous segment (e.g., a phrase), acoustic information may be skipped, with pauses effectively inserted, between words. Therefore, the phonetic search module 220 and PSA capitalize on the great efficiency of the DP technique, while preserving the flexibility of word spotting. The PSA may be appreciated with respect to the pseudo code embodiment of Table 1.

TABLE 1

PSA pseudo code

```
// Layer 1.  Create new segments
         for ( model in WordModels )
{
    if ( model.BeginsWith(sono))
    allSegments.Add( new Segment(model));
}
// Layer 2.  Continue each segment for current time
         for ( segment in allSegments )
{
    // Dynamic Programming step. append sono to segment
    if( segment.appendSono(sono) failed ) continue;
    // connect segment to tree using grammar
    if (segment is not in the tree and segment is finished)
    {
        if (segment.score < MIN_SEGMENT_SCORE) continue;
        // append the segment to tree
        tree.AddBranch(segment);
        // cut low score branches
        tree.Prune( );
        // and expand the classes after the segment
        tree.ExpandLeaves ( );
    }
}
```

Semantic Parser

While the phonetic search module 220 (and PSA) only uses the syntactic structure of the RSG DB 210, i.e., CFG DB 204, semantic parser module 230 uses the complete RSG DB 210, and converts the best word list 222 into a semantic tree instance 232, as is shown in FIG. 2B. Semantic tree instance 232 is comprised of nodes represented as classes, and represents all possible interpretations of the input phonetic stream. Semantic tree instance 232 includes not only the words, but also the structure of data, including both generic semantic information and application specific semantic information, as attributes.

To build semantic tree 232, the semantic parser module 230 matches each word in best word list 222 to a word in a clause in the active grammar tree(s) 212. The algorithm implemented by the semantic parser module 230 works recursively, building the semantic tree instance step-by-step. Using list 222 as an example, the semantic parser module 240 chooses a next class word (e.g., "fifty") and then chooses the next word in the word list (i.e., "five"). This next word is called the "goal". The goal is compared with a current word (e.g., "one") in a current class (i.e., class 215). If the goal word and the current word do not match, the process goes on to compare against a next word (i.e., "two"), as a new current word. The semantic parser module 230 continues doing this until there is a match (i.e., current word is "five"), or until the current words of class 215 are exhausted. If the goal and the current word match, the process returns the result, i.e., appends it to or builds a corresponding sub-tree tree. The process continues within the class as long as is necessary to find all valid interpretations for the goal word. Once all interpretations are found for the goal word within a class, the process continues to the next class word (if any). Once complete, the resulting sub-tree is appended to the partially built semantic tree instance, if any. If there is no match within a class for a goal word, the goal word is re-interpreted as a class name. In which case, the process attempts to expand the class name to expose its class contents, and the above operation is repeated with the class contents. In this case, the goal word "five" is not a class name and a match would have occurred at the current word of "five". Once all words in the word list are matched, the semantic tree instance 232 is complete and represents all valid interpretations of the input phonetic stream.

The semantic parser module 230 provides universal semantic processing within a very large range of semantic possibilities. It can thus support a wide range of applications. Each spoken utterance in a conversation is represented in a class-based semantic tree, like tree 332. All of the trees of a conversation can be remembered as one (large) tree containing all of the individual semantic tree instances. This allows, for example, replacement of corrected information by replacing or modifying at the sub-tree level, without regeneration of the entire tree, no matter how the information was obtained, in what order it was obtained, or how it was spoken. This provides a generalized and consistent approach to the problem of conversational dynamics. Word list conversion to semantic tree instance (recursive function) can be appreciated with the reference to pseudo code embodiment of Table 2.

TABLE 2

Semantic Parser Pseudo Code

```
// Inputs:
//   target_it, target_end - begin and end of the word list being parsed
//   pattern_it, pattern_end - begin and end of the current grammar class
// Output:
//   parse_tree - semantic tree being created
// Global data used:
//   db - list of grammar classes
bool match( target_it, target_end, pattern_it, pattern_end, parse_tree)
```

TABLE 2-continued

Semantic Parser Pseudo Code

```
{
    tend = (target_it==target_end);
    pend = (pattern_it==pattern_end);
    if(tend) return pend;
    tit = target_it;
    // First, try match the goal as an atom
    goal = (*tit++);
    word = (*pattern_it);
    if(goal==word) {
        // check the remaining pattern
        pit = pattern_it;
        if(match(tit,target_end, ++pit, pattern_end, parse_tree)) {
            parse_tree->push_front(new tree(goal,word));
            pattern_it=pit;
            return true;
        }
    }
    // Second, try to match the goal as a class
    for(cls in db) {
        if(goal==cls) {
            // Enumerate all the clauses in the class
            for(clause in cls) {
                // concatenate clause and the rest of the target (after the goal)
                new_target = clause + tit;
                // Try to match
                temp_pattern_it = pattern_it;
                if(match(new_target.begin( ),new_target.end( ),
                    temp_pattern_it,pattern_end, parse_tree)) {
                    // create subtree
                    subtree = new tree(clause,cls);
                    // move to subtree nodes created from the clause
                    for(cit in clause) {
                        subtree->push_back(parse_tree);
                        parse_tree->pop_front( );
                    }
                    parse_tree->push_front(subtree);
                    pattern_it = temp_pattern_it;
                    return true;
                }
            }
        }
    }
    return false;
}
```

Application Program

Application program 250 provides the context, prompts, linguistic result processing, and general session management. The application program 250 may be, as an example, part of a transactional program that conducts medical surveys of individuals over the phone. Application program 250 preferably maintains knowledge of the prompt awaiting a response, so knows the context to apply to the phonetic stream received in response to the prompt. The semantic tree instance 232 output by the semantic parser 230 is received by the application program, which passes the semantic tree instance 232 and context information to the semantic tree evaluator module 240 for final interpretation, as discussed below.

The application program 250 must be configured to interface with the semantic parser module 230 to receive the semantic tree instance 232. The application program 250 is also required to be configured to access the semantic tree evaluator module, which may serve as a tool to the application program 250. This access allows communication of the semantic tree instance and context information from the application program to the semantic tree evaluator module and receipt of the interpretation of the semantic tree instance, as a linguistic result. Given identification of the information to be exchanged, as provided herein, such interfaces may be programmed using standard OOD techniques.

Semantic Tree Evaluator

Upon receipt of the semantic tree instance 232 and context information from the application program 250, the semantic tree evaluator module 240 selectively determines and then applies the categories to nodes of the semantic tree instance. The context information reflects the expected responses and conceptually may be thought to include a set of questions, i.e., is the response a number? Since the semantic tree instance 232 is context free, it can be interpreted in accordance with a variety of contexts (and related categories) to produce one of a variety of results. Applying the proper context allows the proper category to be determined, which ensures the semantic tree instance is interpreted to produce the proper result.

Semantic tree evaluator 340 performs a recursive tree traversal on the semantic tree 332, starting from the top-down, going node-by-node. The node being evaluated is referred to as the "solution" node. Different categories may be applied to different nodes, depending on the context. The evaluation only goes as deep as is necessary in the solution node to determine the appropriate category. Once the proper category is determined, if any, semantic evaluator module 240 returns the category value to the solution node. The solution node can then be fully evaluated using that category. If the category cannot be determined, then the semantic tree evaluator module returns the concatenation of the sub-tree values for that node. If the semantic tree evaluator module finds an operator at the solution node, a default operator is replaced with the true operator. The interpreted semantic data forms a linguistic result that is returned to the application program, which then determines its next prompt as a function of the returned semantic data.

Using the example of FIG. 2A and FIG. 2B, assume the context asks the question: "Did we get a number string?" and the response includes the phrase "fifty-five". When the semantic tree evaluator finds the word "fifty" at the top level of a node, the semantic tree evaluator will not process the remaining levels to determine that the number category is to be applied to that node. Rather, the semantic tree evaluator 240 returns appropriate category, as soon as possible, and then interprets the class using that category to arrive at obtain a value. In this example, the phrase "fifty-five", would be determined to be "55", and not "505", when interpreted using the number category.

When the semantic tree is fully evaluated, i.e., all nodes have been interpreted in accordance with an appropriate category, the semantic tree evaluator 240 packages that resulting semantic data 242 linguistic result as code in a form useful to application program 250. Application program 250, then uses the semantic data 242 in accordance with its functionality (e.g., survey conduct). The semantic tree evaluator module 240 may be further appreciated with reference to the pseudo code embodiment of Table 3.

TABLE 3

Semantic Tree Evaluator Pseudo Code

```
String evaluate(SemanticTree tree, String cat, String op)
{
    SemanticTree attr = tree.GetAttr( );
    // analize attributes for value or operator of given category
    if(attr!=null) {
        SemanticTree value = find2(attr,VALUE,cat);
        if(value!=null) {
            if(value.size( )!=0)
                return ((SemanticTree)(value.elementAt(0))).GetNode( );
        }
```

TABLE 3-continued

Semantic Tree Evaluator Pseudo Code

```
    SemanticTree operator = find2(attr,OPERATOR,cat);
    if(operator!=null) {
        if(operator.size( )==1)
            op = ((SemanticTree)(operator.elementAt(0))).GetNode( );
        }
    }
// default operator
if(op==null) op = "";
// leaf node?
// yes, return it's value
if(tree.size( )==0) return tree.GetNode( );
// no, scan the tree!
Enumeration e = tree.elements( );
// evaluate leftmost subtree
String val1 = new String(evaluate(((SemanticTree)e.nextElement( )),
cat,op));
// evaluate all the other subtrees, concatenating values
while(e.hasMoreElements( )) {
    String val2 = evaluate(((SemanticTree)e.nextElement( )),cat,op);
    int len1 = val1==null? 0 : val1.length( );
    int len2 = val2==null? 0 : val2.length( );
    if(len1>0 && len2>0) {
        val1 = binop(op,val1,val2);
    } else if(len2>0) {
        val1 = val2;
    }
}
return val1;
}
```

The invention may be embodied in other specific forms without departing from the spirit or central characteristics thereof. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A phonetic data processing system comprising:
   A. a computer processing device having access to a memory;
   B. a rich semantic grammar (RSG) stored in said memory and comprising one or more grammars comprising syntactic information and semantic information; and
   C. a phonetic data processing module, executable by said processing device, said module comprising:
      (1) a phonetic searcher, configured to generate, using syntactic analysis and as a function of syntactic information derived from said RSG and a received phonetic stream comprised of phonetic estimates, a set of sequences comprising a set of best words from said RSG corresponding to said phonetic estimates; and
      (2) a semantic parser module, configured to generate a context free set of semantic data from said sequences and said RSG, wherein said set of semantic data includes all valid interpretations of the sequences.

2. A system as in claim 1, wherein each of said sequences comprises set of words combined to define word paths.

3. A system as in claim 1, wherein said phonetic searcher is configured to extract a context free grammar (CRG) comprising syntactic information from said RSG and is further configured to access said CFG to generate said set of best words.

4. A system as in claim 1, wherein each of said phonetic estimates has a fixed start time and a plurality of end times, and wherein there is a score associated with each end time corresponding to the likelihood that a given phonetic estimate is a word or a syllable in said RSG.

5. A system as in claim 4, wherein said phonetic searcher includes a grammar builder configured to selectively combine words from said set of best words into sequences, as a function of the start time and end times of said phonetic estimates corresponding to said words.

6. A system as in claim 5, said phonetic searcher is configured to combine said words using dynamic programming.

7. A system as in claim 1, wherein said semantic information includes one or more categories, and each category may dictates an interpretation of semantic data at a corresponding node.

8. A system as in claim 1, wherein said semantic information includes one or more operators at any tree node, and each operator dictates an interpretation for a sub-tree at a corresponding node.

9. A system as in claim 1, further comprising:
   (3) an application program, configured to receive said set of semantic data and to define context information associated with said phonetic stream;
   (4) a semantic evaluator, configured to interpret said set of semantic data in accordance with said context information and to derive a linguistic result therefrom.

10. A system as in claim 9, wherein said set of semantic data is represented as a tree of nodes representing all valid interpretations of said word sequences and said semantic evaluator is configured to determine a category at each node, as a function of said context information, and to apply to values at each node a corresponding category to determine said linguistic result.

11. A phonetic data processing system, comprising:
    A. a computer processing device having access to a memory;
    B. a rich semantic grammar (RSG) stored in said memory and comprising one or more grammars comprising syntactic information and semantic information; and
    C. a phonetic data processing module, executable by said processing device, said module comprising:
       (1) a phonetic searcher, configured to generate, as a function of said RSG and a received phonetic stream comprised of phonetic estimates, a set of sequences comprising a set of best words from said RSG corresponding to said phonetic estimates; and
       (2) a semantic parser module, configured to generate a set of semantic data from said sequences and said RSG, wherein said set of semantic data includes all valid interpretations of the sequences,
    wherein said RSG is a context free grammar tree comprising nodes having certain of said syntactic and semantic information associated with each of a plurality of said nodes.

12. A phonetic data processing system, comprising:
    A. a computer processing device having access to a memory;
    B. a rich semantic grammar (RSG) stored in said memory and comprising one or more grammars comprising syntactic information and semantic information; and
    C. a phonetic data processing module, executable by said processing device, said module comprising:
       (1) a phonetic searcher, configured to generate, as a function of said RSG and a received phonetic stream comprised of phonetic estimates, a set of sequences comprising a set of best words from said RSG corresponding to said phonetic estimates; and
       (3) a semantic parser module, configured to generate a set of semantic data from said sequences and said RSG, wherein said set of semantic data includes all valid interpretations of the sequences, wherein said set of semantic data is a semantic tree comprised of a set of nodes representing all valid interpretations of said sequences.

13. A method of processing phonetic data, comprising:
   A. defining in a memory a rich semantic grammar (RSG) comprising syntactic and semantic information;
   B. receiving a phonetic stream comprising phonetic estimates;
   C. generating, using syntactic analysis, a set of sequences comprised of best words, as a function of syntactic information derived from said RSG and said phonetic stream;
   D. generating, from said sequences and said RSG, a context free set of semantic data including all valid interpretations of said sequences.

14. A method as in claim 13, wherein each of said sequences is comprised of a set of words combined to define word paths.

15. A method as in claim 13, wherein said phonetic searching includes extracting a context free grammar comprising syntactic information from said RSG.

16. A method as in claim 13, wherein said phonetic searching includes:
   (1) determining for each of said phonetic estimates a fixed start time and a plurality of end times; and
   (2) determining a score associated with each end time corresponding to the likelihood that a given phonetic estimate is a word or a syllable in said RSG.

17. A method as in claim 16, wherein said phonetic searching further includes:
   (3) combining said words from said set of best words into said sequences, as a function of the start time and the end times of said phonetic estimates corresponding to said words.

18. A method as in claim 16, wherein said phonetic searching includes:
   (3) combining said words using dynamic programming.

19. A method as in claim 13, wherein said RSG is a grammar tree comprising nodes having certain of said syntactic and semantic information associated with each of said nodes.

20. A method as in claim 13, further including:
   E. defining a context associated with said phonetic stream by an application program; and
   F. interpreting said set of semantic data with a semantic evaluator, in accordance with said context, and deriving a linguistic result therefrom.

21. A method as in claim 20, wherein interpreting said set of semantic data includes, for each node, determining a category at a given node, as a function of said context, and applying said category to interpret values at said given node.

22. A method as in claim 13, wherein generating said set of semantic data includes generating a semantic tree instance comprised of a set of nodes representing all valid interpretations of said sequences.

23. A phonetic searcher, coupled to a database comprising a rich semantic grammar (RSG) tree including syntactic and semantic information at each node in said grammar tree, and configured to receive a phonetic stream of data and to generate a word list representing all valid words represented by said phonetic stream, as a function of syntactic information derived from derived said RSG tree.

24. A grammar builder configured to combine words in a word path, wherein the grammar builder is coupled to a database comprising a context free grammar, including syntactic information, and is coupled to a database comprising a context free set words representing valid interpretations of a stream of phonetic estimates, wherein each of said phonetic estimates is represented as having a fixed start time and a plurality of end times, and wherein said grammar builder is configured to selectively combine words from said set of words as a function of said fixed start time and said end times of phonetic estimates corresponding said words to be combined.

25. A grammar builder as in claim 24, wherein for each phonetic estimate, a score is associated with each of said end times, and wherein said score is related to a probability that said phonetic estimate is a certain word or syllable from said context free grammar.

26. A semantic parser coupled to a database having a context free rich semantic grammar (RSG) and configured to generate a context free set of semantic data as a function of a set of word sequences and said RSG, wherein said sequences include words derived from a phonetic stream and said RSG, and said set of semantic data includes all valid interpretations of the sequences.

27. A semantic parser as in claim 26, wherein the RSG is a grammar tree comprised of a plurality of nodes, one or more of said nodes including syntactic information and semantic information.

28. A semantic parser as in claim 26, wherein said set of semantic data is a semantic tree.

29. A semantic tree evaluation tool coupled to an application program that defines a context and coupled to a memory including a semantic tree representing all valid interpretations of a phonetic stream, said semantic tree evaluation tool configured to generate a linguistic result as a single valid interpretation of said phonetic stream, in accordance with said context of the application program.

30. A semantic evaluation tool as in claim 29, wherein said semantic tree is comprised of a plurality of nodes including semantic information, and wherein said semantic evaluation tool is configured to determine at each of said nodes a category, as a function of said context, and to apply to values at each node a corresponding category to determine said linguistic result.

* * * * *

UNITED STATES PATENT AND TRADEMARK OFFICE
CERTIFICATE OF CORRECTION

PATENT NO. : 6,895,377 B2
DATED : May 17, 2005
INVENTOR(S) : Kroeker et al.

It is certified that error appears in the above-identified patent and that said Letters Patent is hereby corrected as shown below:

Column 17,
Line 4, after "grammar", delete "(CRG)", and insert therefor -- (CFG) --.

Signed and Sealed this

Nineteenth Day of July, 2005

JON W. DUDAS
*Director of the United States Patent and Trademark Office*